US012529717B2

United States Patent
Ikeda et al.

(10) Patent No.: US 12,529,717 B2
(45) Date of Patent: Jan. 20, 2026

(54) ELECTRONIC COMPONENT INSPECTION METHOD

(71) Applicant: NGK INSULATORS, LTD., Nagoya (JP)

(72) Inventors: Ryusuke Ikeda, Ichinomiya (JP); Tomohiko Hibino, Inazawa (JP); Takao Ohnishi, Fuso-cho (JP)

(73) Assignee: NGK INSULATORS, LTD., Nagoya (JP)

( * ) Notice: Subject to any disclaimer, the term of this patent is extended or adjusted under 35 U.S.C. 154(b) by 149 days.

(21) Appl. No.: 18/472,294

(22) Filed: Sep. 22, 2023

(65) Prior Publication Data

US 2024/0012038 A1 Jan. 11, 2024

Related U.S. Application Data

(63) Continuation of application No. PCT/JP2022/009766, filed on Mar. 7, 2022.

(30) Foreign Application Priority Data

Mar. 29, 2021 (JP) ................................. 2021-055173

(51) Int. Cl.
*G01R 27/02* (2006.01)
*G01R 29/22* (2006.01)
(Continued)

(52) U.S. Cl.
CPC ............. *G01R 27/02* (2013.01); *G01R 29/22* (2013.01); *G01S 1/68* (2013.01); *G01S 11/02* (2013.01); *G01S 2205/02* (2020.05)

(58) Field of Classification Search
CPC ........ G01R 27/02; G01R 29/22; G01N 27/20; G01S 1/68; G01S 2205/02; G01S 11/02
(Continued)

(56) References Cited

U.S. PATENT DOCUMENTS

2005/0248238 A1 11/2005 Yamada et al.
2007/0052431 A1* 3/2007 Aoshima ............ G01R 27/2635
324/725
(Continued)

FOREIGN PATENT DOCUMENTS

JP 06-148243 A 5/1994
JP 09-033334 A 2/1997
(Continued)

OTHER PUBLICATIONS

WO 2020066936 Machine Translation, Sep. 20, 2019 (Year: 2019).*
(Continued)

*Primary Examiner* — Raul J Rios Russo
(74) *Attorney, Agent, or Firm* — MATTINGLY & MALUR, PC

(57) ABSTRACT

An electronic component includes a first surface with a first electrode and a second surface with a second electrode. A measuring instrument includes a first terminal and a second terminal. Only the second surface out of the first surface and the second surface is adhered to a conductive adhesive sheet. The first terminal of a measuring instrument is electrically connected to the first electrode at the first surface, the second terminal of the measuring instrument is electrically connected to the second electrode through the conductive adhesive sheet at the second surface, and the electronic component is measured using the measuring instrument.

11 Claims, 2 Drawing Sheets

(51) Int. Cl.
*G01S 1/68* (2006.01)
*G01S 11/02* (2010.01)

(58) Field of Classification Search
USPC .......................................................... 324/600
See application file for complete search history.

(56) References Cited

U.S. PATENT DOCUMENTS

| | | | |
|---|---|---|---|
| 2015/0120051 A1* | 4/2015 | Matsuzawa | B25J 13/085 700/258 |
| 2017/0148974 A1 | 5/2017 | Yonemura et al. | |
| 2017/0279034 A1* | 9/2017 | Matsuzawa | G01L 1/16 |
| 2020/0209302 A1 | 7/2020 | Obata et al. | |
| 2021/0305492 A1 | 9/2021 | Ueda et al. | |
| 2021/0343927 A1 | 11/2021 | Nagaoka et al. | |
| 2022/0272458 A1 | 8/2022 | Kagawa et al. | |
| 2022/0359812 A1 | 11/2022 | Takeda et al. | |
| 2024/0012038 A1* | 1/2024 | Ikeda | G01R 27/02 |

FOREIGN PATENT DOCUMENTS

| | | |
|---|---|---|
| JP | 2007-129776 A | 5/2007 |
| JP | 2016-25142 A | 2/2016 |
| JP | 2019-004184 A | 1/2019 |
| JP | 2019-067935 A | 4/2019 |
| JP | 2020-102615 A | 7/2020 |
| WO | 2019/054337 A1 | 3/2019 |
| WO | 2020/066936 A | 4/2020 |
| WO | 2020/262256 A1 | 12/2020 |
| WO | 2021/095511 A1 | 5/2021 |

OTHER PUBLICATIONS

International Preliminary Report on Patentability received in corresponding International Application No. PCT/JP2022/009766 dated Oct. 12, 2023.
Japanese Office Action received in corresponding Japanese Application No. 2020-167844 dated Feb. 20, 2024.
International Search Report of PCT/JP2022/009766 dated May 10, 2022.
Japanese Office Action received in corresponding Japanese Application No. 2023-510740 dated Aug. 6, 2024.

* cited by examiner

ELECTRONIC COMPONENT INSPECTION METHOD

CROSS-REFERENCE TO RELATED APPLICATION

This application is a continuation application of PCT/JP2022/009766, filed on Mar. 7, 2022, which claims the benefit of priority of Japanese Patent Application No. 2021-055173, filed on Mar. 29, 2021, the entire contents of which are incorporated herein by reference.

BACKGROUND OF THE INVENTION

Field of the Invention

The present invention relates to an electronic component inspection method, and in particular to an electronic component inspection method of measuring an electronic component using a measuring instrument electrically connected to the electronic component.

Description of the Background Art

WO2019/054337 exemplifies a method of inspecting a piezoelectric element. A first terminal and a second terminal are formed on one surface of the piezoelectric element. First, the other surface of the piezoelectric element facing the one surface is held by a low-adhesive sheet with a surface resistance greater than or equal to $1 \times 10^{16} \Omega$. Then, electrical characteristics of the piezoelectric element are evaluated with application of a voltage between an electrode of the first terminal and an electrode of the second terminal. Capacitance inspection and resonance inspection are conducted as the evaluation of the electrical characteristics. In the capacitance inspection, an LCR meter measures a capacitance with a measurement signal at a frequency of 1 kHz. In the resonance inspection, a network analyzer measures frequency dependence of an impedance of the piezoelectric element, using a measurement signal at a frequency ranging from 7.2 to 7.9 MHz. Evaluating results of the resonance inspection can determine whether the piezoelectric element has any cracks. Specifically, when a peak value of the impedance at a resonance frequency exceeds a given threshold, it is determined that the piezoelectric element has no crack. On the other hand, when the peak value of the impedance at the resonance frequency does not exceed the given threshold, it is determined that the piezoelectric element has a crack.

The inspection method described in the aforementioned publication is performed with application of a voltage between the two electrodes on a common surface. In many chip electronic component inspections, however, two terminals requiring electrical connection are formed on different surfaces, typically, on both end faces. Thus, in many cases, the inspection method described in the aforementioned publication is not applicable.

In contrast, Japanese Patent Application Laid-Open No. 2019-67935 discloses a method of inspecting chip electronic components each including electrodes at both ends that are opposed to each other. In this inspecting method, the chip electronic components are housed in respective electronic component storage holes so that at least parts of the electrodes of each of the chip electronic components protrude from both opening surfaces of the electronic component storage hole. Then, a voltage is applied to the respective electrodes at the ends by bringing a movable-rolling electrode terminal and a fixed electrode terminal of an inspection machine into contact with the electrodes.

(Patent Document 1: WO2019/054337)
(Patent Document 2: Japanese Patent Application Laid-Open No. 2019-67935)

In the aforementioned inspecting method, the electronic components are sometimes displaced in the storage holes. Consequently, the electronic components sometimes collide with inner walls of the storage holes. Then, the impact of the collision sometimes causes loss or damage of the electronic components. Moreover, as a result of the displacement, the terminals of the measuring instrument sometimes do not come in sufficient contact with the electrodes of each of the electronic components. This requires reexamination, and thus increases the time required to inspect the electronic components.

SUMMARY

The present invention has been conceived to solve the problems, and has an object of providing an electronic component inspection method that can facilitate inspection of an electronic component involving electrically connecting a measuring instrument to the electronic component while stably holding the electronic component without any significant damage.

A first aspect is an electronic component inspection method of inspecting an electronic component using a measuring instrument, the electronic component including a first surface with a first electrode and a second surface with a second electrode, the measuring instrument including a first terminal and a second terminal, the method including the steps of: (a) adhering only the second surface of the first surface and the second surface to a conductive adhesive sheet; and (b) electrically connecting the first terminal of the measuring instrument to the first electrode at the first surface, electrically connecting the second terminal of the measuring instrument to the second electrode through the conductive adhesive sheet at the second surface, and measuring the electronic component using the measuring instrument.

A second aspect is the electronic component inspection method according to the first aspect, wherein the conductive adhesive sheet is supported by a metal component in the step (a).

A third aspect is the electronic component inspection method according to the second aspect, wherein the second terminal of the measuring instrument is electrically connected to the conductive adhesive sheet through the metal component in the step (b).

A fourth aspect is the electronic component inspection method according to one of the first to third aspects, and the step (b) includes (b-1) a step of measuring an impedance between the first terminal and the second terminal in a frequency region including at least one measuring frequency. An absolute value of an impedance of the conductive adhesive sheet between the second electrode and the second terminal is lower than an absolute value of an impedance of the electronic component between the first electrode and the second electrode, at the at least one measuring frequency.

A fifth aspect is the electronic component inspection method according to the fourth aspect, wherein the at least one measuring frequency includes a frequency higher than or equal to 1 MHz.

A sixth aspect is the electronic component inspection method according to the fourth or the fifth aspect, wherein the electronic component is partly made of a piezoelectric material.

A seventh aspect is the electronic component inspection method according to the sixth aspect, wherein the at least one measuring frequency includes an anti-resonance frequency corresponding to a maximum outside dimension of the electronic component.

An eighth aspect is the electronic component inspection method according to the seventh aspect, and further includes (c) evaluating mechanical defects of the electronic component, based on the impedance measured in the step (b-1) at the anti-resonance frequency.

A ninth aspect is the electronic component inspection method according to the fourth or the fifth aspect, wherein the at least one measuring frequency includes at least one electrical resonance frequency of the electronic component.

According to the first aspect, first, the electronic component is secured to the conductive adhesive sheet with its adhesion properties. This can stably hold the electronic component without damage. Second, the second terminal of the measuring instrument is electrically connected to the second electrode of the electronic component at the second surface through the conductive adhesive sheet. This can facilitate securing the electrical connection to the second electrode of the electronic component at the second surface by using the conductivity of the conductive adhesive sheet, while the first surface of the electronic component is directed to facilitate the electrical connection of the measuring instrument to the first electrode of the electronic component. This can facilitate inspection of the electronic component involving electrically connecting the measuring instrument to the electronic component while stably holding the electronic component without any significant damage.

According to the second aspect, the conductive adhesive sheet is supported by a metal component. Consequently, not only the conductive adhesive sheet but also the metal component can be used as an electrical path between the second electrode of the electronic component and the second terminal of the measuring instrument.

According to the third aspect, the second terminal of the measuring instrument is electrically connected to the conductive adhesive sheet through the metal component. This can attach an electrical path from the second terminal of the measuring instrument not to the conductive adhesive sheet but to the metal component.

According to the fourth aspect, an absolute value of an impedance of the conductive adhesive sheet between the second electrode and the second terminal is lower than an absolute value of an impedance of the electronic component between the first electrode and the second electrode, at the at least one measuring frequency. Consequently, the impedance of the electronic component can be measured at the measuring frequency without being significantly disturbed by the impedance of the conductive adhesive sheet.

According to the fifth aspect, the at least one measuring frequency includes a frequency higher than or equal to 1 MHz. This enables the inspection at a sufficiently high frequency.

According to the sixth aspect, the electronic component is partly made of a piezoelectric material. Consequently, mechanical resonance of the electronic component with application of a voltage from the measuring instrument can be used for inspecting the electronic component.

According to the seventh aspect, the at least one measuring frequency includes an anti-resonance frequency corresponding to a maximum outside dimension of the electronic component. Consequently, the mechanical resonance of the electronic component can be used for inspecting the electronic component at measuring frequencies as low as possible.

According to the eighth aspect, mechanical defects of the electronic component are evaluated based on the impedance at the anti-resonance frequency. Consequently, mechanical defects of the electronic component can be evaluated with the mechanical resonance.

According to the ninth aspect, the at least one measuring frequency includes at least one electrical resonance frequency of the electronic component. Consequently, the electrical resonance of the electronic component can be used for inspecting the electronic component.

The object, features, aspects, and advantages of the present invention will become more apparent from the following detailed description and the accompanying drawings.

DESCRIPTION OF THE PREFERRED EMBODIMENTS

An embodiment of the present invention will be hereinafter described with reference to the drawings.

Figure 1:
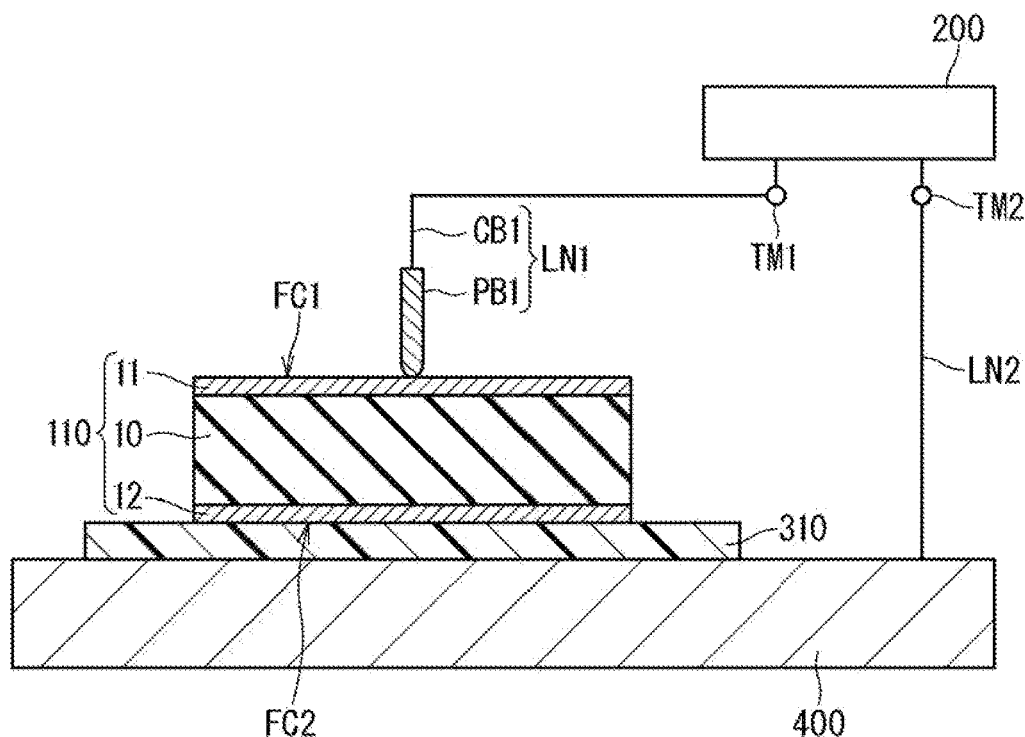
FIG. 1 schematically illustrates a measuring step in an electronic component inspection method according to an embodiment.

FIG. 1 schematically illustrates a measuring step in an electronic component inspection method according to the embodiment. With reference to FIG. 1, a piezoelectric element 110 (an electronic component) to be inspected in this embodiment includes: a base 10, an upper surface FC1 (a first surface) with an electrode 11 (a first electrode), and a lower surface FC2 (a second surface) with an electrode 12 (a second electrode). Here, the second surface is a surface different from the first surface, typically, a surface opposite to the first surface as in this embodiment. At least a part of the base 10 may be made of a ceramic, and be made of a piezoelectric ceramic in this embodiment. Thus, the electronic component in this embodiment is partly made of a piezoelectric material. The base 10 may include inner electrode layers (not illustrated) extending from the electrode 11 and the electrode 12.

Next, a structure of a measurement system to be used in the measuring step will be hereinafter described.

A network analyzer 200 (a measuring instrument) is for inspecting the piezoelectric element 110, and includes a terminal TM1 (a first terminal) and a terminal TM2 (a second terminal). A wiring path LN1 and a wiring path LN2 are connected to the terminal TM1 and the terminal TM2, respectively. The wiring path LN1 includes a wire CB1 (e.g., a signal cable), and a probe PB1 (e.g., a probe needle) connected to the terminal TM1 through the wire CB1.

A stage 400 (a metal component) is a component containing metal, for example, aluminum. The stage 400 is electrically connected to the terminal TM2 of the network analyzer 200 through the wiring path LN2. The stage 400 includes a supporting surface (an upper surface in FIG. 1). It is preferred that the supporting surface is a flat surface, and it is preferred that the flat surface is normal to a vertical direction.

A conductive adhesive sheet 310 includes an adhesive face (an upper surface in FIG. 1), and a back side (a lower surface in FIG. 1). The adhesive face has holding power for holding the piezoelectric element 110 by adhesion. The holding power of the adhesive face may originate from physical bonding (secondary bond, i.e., intermolecular bond). The holding power of the adhesive face ranges, for example, from 0.98 N/cm$^2$ (0.10 kgf/cm$^2$) to 4.9 N/cm$^2$ (0.50 kgf/cm$^2$). The back side of the conductive adhesive sheet 310 is attached to the supporting surface of the stage 400. This electrically connects the conductive adhesive sheet 310 to the stage 400.

The conductive adhesive sheet 310 has conductivity. The conductive adhesive sheet 310 typically includes a base material made of a resin, and conductive fillers dispersed in the base material. The base material is made of, for example, fluoro rubber. The conductive fillers are made of, for example, carbon black.

The conductive adhesive sheet 310 is, for example, 0.1 mm to 1.0 mm thick. The Young's modulus of the conductive adhesive sheet 310 ranges, for example, from 5.0 MPa to 10.0 MPa. The conductive adhesive sheet 310 has a heat resistance, for example, higher than or equal to 90° C. The conductive adhesive sheet 310 has a thermal conductivity, for example, higher than or equal to 0.05 W/mK.

Figure 2:
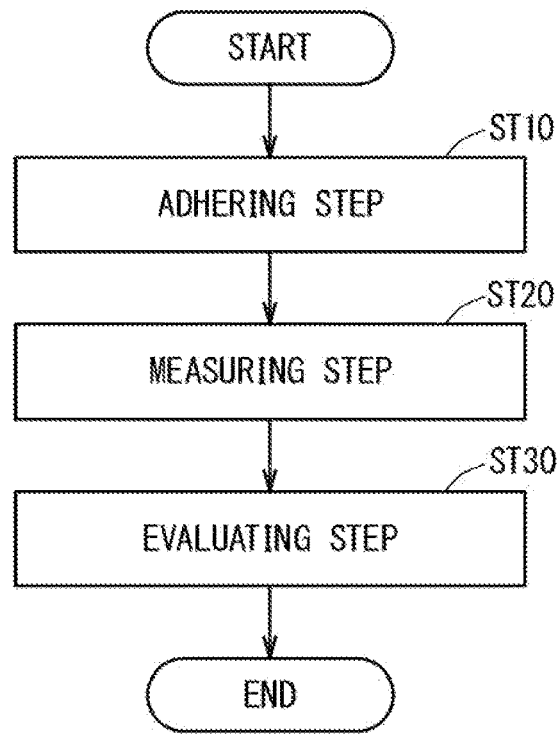
FIG. 2 is a flowchart schematically illustrating the electronic component inspection method according to the embodiment.

FIG. 2 is a flowchart schematically illustrating an electronic component inspection method including the measuring step.

In Step ST10 (FIG. 2), an adhering step is performed. Specifically, the lower surface FC2 of the piezoelectric element 110 is adhered to the adhesive face of the conductive adhesive sheet 310 supported by the stage 400 as illustrated in FIG. 1. On the other hand, the upper surface FC1 of the piezoelectric element 110 is not adhered to the conductive adhesive sheet 310. Thus, only the lower surface FC2 of the upper surface FC1 and the lower surface FC2 is adhered to the conductive adhesive sheet 310. Adhering the lower surface FC2 to the conductive adhesive sheet 310 not only secures the piezoelectric element 110 to the conductive adhesive sheet 310 but also electrically connects the electrode 12 of the piezoelectric element 110 to the conductive adhesive sheet 310.

In Step ST20 (FIG. 2), a measuring step is performed. Specifically, the terminal TM1 of the network analyzer 200 is electrically connected to the electrode 11 of the piezoelectric element 110 at the upper surface FC1, and the terminal TM2 of the network analyzer 200 is electrically connected to the electrode 12 of the piezoelectric element 110 at the lower surface FC2 through the conductive adhesive sheet 310. With these connections being maintained, the network analyzer 200 measures the piezoelectric element 110. Here, the wiring path LN2 may be directly connected to the stage 400 without through the conductive adhesive sheet 310. In this case, the terminal TM2 of the network analyzer 200 is electrically connected to the conductive adhesive sheet 310 through the stage 400. The electrical connection of the terminal TM1 is secured by bringing the probe PB1 in contact with the electrode 11 of the piezoelectric element 110 at the upper surface FC1. In this embodiment, an impedance between the terminal TM1 and the terminal TM2 is measured in a frequency region including at least one measuring frequency. The at least one measuring frequency may include a frequency higher than or equal to 1 MHz. In the measurement, for example, a measurement signal of +4 dBm is used.

Figure 3:
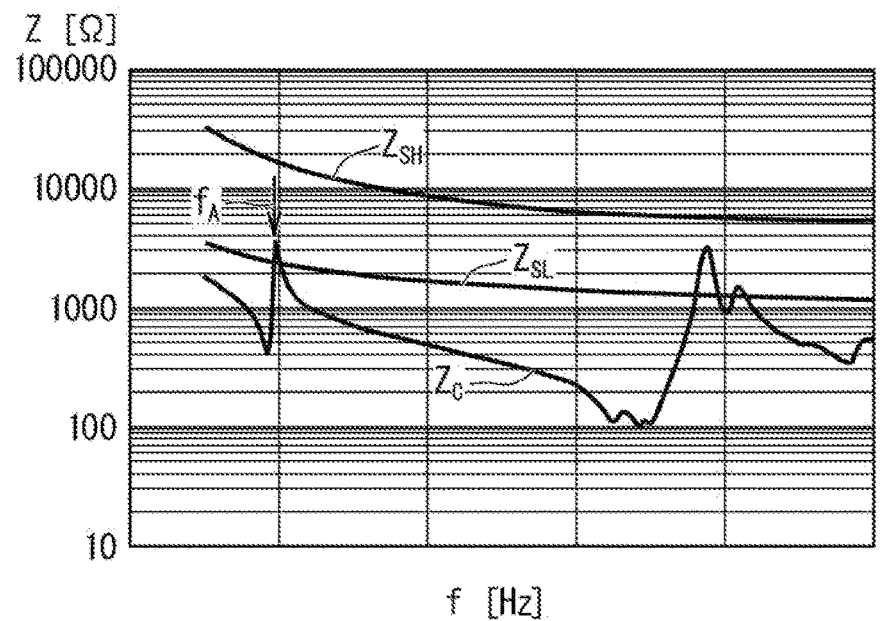
FIG. 3 is a graph exemplifying frequency dependence of each impedance of a conductive adhesive sheet with relatively low conductivity, a conductive adhesive sheet with relatively high conductivity, and an electronic component.

With reference to FIG. 3, a graph with a horizontal axis representing a frequency f exemplifies frequency dependence of each of an impedance $Z_{SH}$ of the conductive adhesive sheet 310 with relatively low conductivity, an impedance $Z_{SL}$ of the conductive adhesive sheet 310 with relatively high conductivity, and an impedance $Z_C$ of the piezoelectric element 110 between the electrode 11 and the electrode 12. Here, the impedance of the conductive adhesive sheet 310 is defined as an impedance between the electrode 12 and the terminal TM2 of the network analyzer 200. Each of the impedances illustrated in the example of FIG. 3 is indicated by its absolute value. An arrow in the graph indicates an anti-resonance frequency $f_A$ (parallel resonance frequency) corresponding to the maximum outside dimension of the piezoelectric element 110.

When a value of the impedance $Z_C$ at a measuring frequency is used for evaluating the piezoelectric element 110, an absolute value of the impedance of the conductive adhesive sheet 310 is preferably lower than that of the impedance $Z_C$ of the piezoelectric element 110. In particular, when a peak value of the impedance $Z_C$ at the anti-resonance frequency $f_A$ is used for evaluating the piezoelectric element 110, an absolute value of the impedance of the conductive adhesive sheet 310 is preferably lower than that of the impedance $Z_C$ at the anti-resonance frequency $f_A$. In such a case, the conductive adhesive sheet 310 with not the impedance $Z_{SH}$ but the impedance $Z_{SL}$ is preferably used.

In Step ST30 (FIG. 2), an evaluating step is performed. Specifically, mechanical defects of the piezoelectric element 110 are evaluated based on the peak value of the impedance $Z_C$ measured in Step ST20 at the anti-resonance frequency $f_A$. Typically, it is determined that the piezoelectric element 110 has no crack if the peak value is relatively larger than a predetermined threshold and that the piezoelectric element 110 has a crack if the peak value is relatively smaller than the predetermined threshold.

Figure 4:
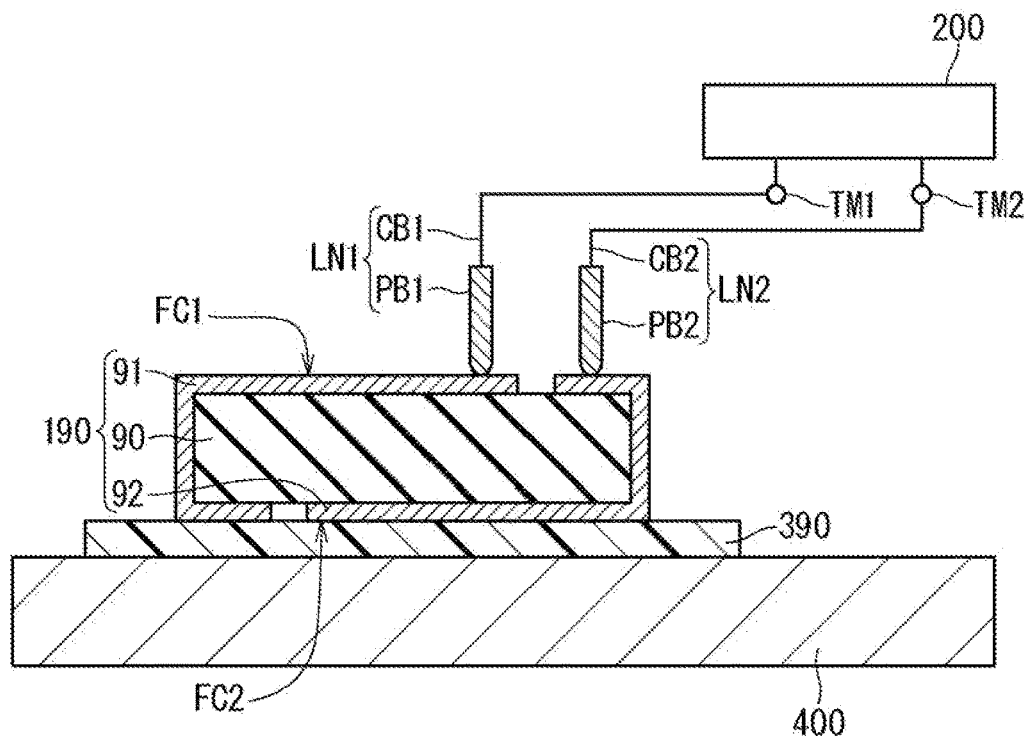
FIG. 4 schematically illustrates a measuring step in an electronic component inspection method according to a comparative example.

FIG. 4 schematically illustrates a measuring step in an electronic component inspection method according to a comparative example. In this comparative example, the wiring path LN2 connected to the terminal TM2 of the network analyzer 200 includes a wire CB2 and a probe PB2. A piezoelectric element 190 to be inspected in this comparative example includes a base 90, and electrodes 91 and 92. Each of the electrodes 91 and 92 extends over both of the upper surface FC1 and the lower surface FC2. Thus, the probe PB1 and the probe PB2 can be brought in contact with the electrode 91 and the electrode 92, respectively, from upward at the upper surface FC1 to ensure the electrical connection for the measurements. Here, the lower surface FC2 of the piezoelectric element 190 is adhered to an adhesive sheet 390. If the adhesive sheet 390 does not have sufficiently high insulation properties, the electrical connection between the electrodes 91 and 92 through the adhesive sheet 390 significantly disturbs the measurements by the network analyzer 200 between the electrodes 91 and 92. Thus, the adhesive sheet 390 needs to be non-conductive sufficiently enough in view of the measurements. Consequently, the adhesive sheet 390 for the comparative example is opposite in conductive requirements to the aforementioned conductive adhesive sheet 310 (FIG. 1) for the aforementioned embodiment. In the first place, the piezoelectric element 190 in the comparative example needs to have both of the electrodes 91 and 92 in the upper surface FC1; the measuring step in the comparative example is, thus, not appliable to the measurements of the piezoelectric element 110 (FIG. 1).

In the embodiment, the piezoelectric element 110 is first secured to the conductive adhesive sheet 310 with its adhesion properties. This can stably hold the piezoelectric element 110 without damage. Second, the terminal TM2 of the network analyzer 200 is electrically connected to the electrode 12 of the piezoelectric element 110 at the lower surface FC2 through the conductive adhesive sheet 310. This can facilitate ensuring the electrical connection to the electrode 12 of the piezoelectric element 110 at the lower surface FC2 by using the conductivity of the conductive adhesive sheet 310, while the upper surface FC1 of the piezoelectric element 110 is directed to facilitate the electrical connection of the network analyzer 200 to the electrode 11 of the piezoelectric element 110. This can facilitate inspection of the piezoelectric element 110 involving electrically connecting the network analyzer 200 to the piezoelectric element 110 while stably holding the piezoelectric element 110 without any significant damage.

The conductive adhesive sheet 310 is supported by the stage 400. Consequently, not only the conductive adhesive sheet 310 but also the stage 400 can be used as an electrical path between the electrode 12 of the piezoelectric element 110 and the terminal TM2 of the network analyzer 200.

The terminal TM2 of the network analyzer 200 is electrically connected to the conductive adhesive sheet 310 through the stage 400. This enables the wiring path LN2 from the terminal TM2 of the network analyzer 200 to be joined not to the conductive adhesive sheet 310 but to the stage 400.

An absolute value of the impedance of the conductive adhesive sheet 310 between the electrode 12 and the terminal TM2 is preferably lower than that of the impedance $Z_C$ (FIG. 3) at the at least one measuring frequency. Consequently, the impedance $Z_C$ of the piezoelectric element 110 can be measured at the frequency without being significantly disturbed by the impedance of the conductive adhesive sheet 310. In particular, when the peak value of the impedance $Z_C$ at the anti-resonance frequency $f_A$ is used for evaluating the piezoelectric element 110, the absolute value of the impedance of the conductive adhesive sheet 310 is preferably lower than that of the impedance $Z_C$ at the anti-resonance frequency $f_A$. In such a case, the conductive adhesive sheet 310 with not the impedance $Z_{SH}$ (FIG. 3) but the impedance $Z_{SL}$ (FIG. 3) is preferably used as described above.

The at least one measuring frequency preferably includes a frequency higher than or equal to 1 MHz. This enables the inspection at a sufficiently high frequency.

The piezoelectric element 110 is partly made of the piezoelectric material. Consequently, mechanical resonance of the piezoelectric element 110 with application of a voltage from the network analyzer 200 can be used for inspecting the piezoelectric element 110. When the mechanical resonance of the piezoelectric element 110 is featured, the at least one measuring frequency needs to include a frequency higher than or equal to 1 MHz in many cases, as described above. In particular, the smaller the piezoelectric element 110 is, the higher the frequency needed for the measurement is.

The at least one measuring frequency includes the anti-resonance frequency $f_A$ corresponding to the maximum outside dimension of the piezoelectric element 110 in this embodiment. Consequently, the mechanical resonance of the piezoelectric element 110 can be used for inspecting the piezoelectric element 110 while making the measuring frequency as low as possible. Specifically, mechanical defects of the piezoelectric element 110 can be evaluated using the mechanical resonance.

Although the embodiment describes a case where an electronic component is the piezoelectric element 110 in detail, the electronic component is not limited to the piezoelectric element but may be a non-piezoelectric element. A non-piezoelectric element is an element that does not actively use piezoelectric effect, for example, a capacitor. The non-piezoelectric element may partly contain the piezoelectric material or contain only a non-piezoelectric material. Thus, an electronic component does not always need to be partly made of the piezoelectric material. When a non-piezoelectric element as an electronic component is partly made of the piezoelectric material, measurements related to piezoelectric effect can be made on the non-piezoelectric element, similarly to the embodiment above. Specifically, mechanical defects of the electronic component can be evaluated based on the impedance at an anti-resonance frequency corresponding to the maximum outside dimension of the electronic component. For example, when a dielectric material of a capacitor has piezoelectric properties, such an evaluation is possible. Irrespective of whether an electronic component is partly made of the piezoelectric material, when the electronic component has an electrical resonance frequency and the at least one measuring frequency includes the electrical resonance frequency, the electrical resonance of the electronic component can be used for inspecting the electronic component.

Although the embodiment describes a case where a measuring instrument is the network analyzer 200 in detail, the measuring instrument is not limited to the network analyzer but may be, for example, an LCR meter. The LCR meter can measure at least any one of an inductance, a capacitance, and a resistance of an electronic component. Depending on application of measurements, a measuring frequency may be lower than 1 MHz. For example, the LCR meter measures a capacitance often at a frequency of approximately 1 kHz. Furthermore, the measuring frequency may be zero, which means a direct current.

What is claimed is:

1. An electronic component inspection method of inspecting an electronic component using a measuring instrument, the electronic component including a first surface with a first electrode and a second surface with a second electrode, the measuring instrument including a first terminal and a second terminal, the method comprising the steps of:
    (a) adhering only the second surface of the first surface and the second surface to a conductive adhesive sheet configured to be removable from the electronic component; and
    (b) electrically connecting the first terminal of the measuring instrument to the first electrode at the first surface, electrically connecting the second terminal of the measuring instrument to the second electrode through the conductive adhesive sheet at the second surface, and measuring the electronic component using the measuring instrument.

2. The electronic component inspection method according to claim 1,
    wherein the conductive adhesive sheet is supported by a metal component in the step (a).

3. The electronic component inspection method according to claim 2, wherein the second terminal of the measuring instrument is electrically connected to the conductive adhesive sheet through the metal component in the step (b).

4. The electronic component inspection method according to claim 1,
wherein the step (b) includes
(b-1) a step of measuring an impedance between the first terminal and the second terminal in a frequency region including at least one measuring frequency, and
an absolute value of an impedance of the conductive adhesive sheet between the second electrode and the second terminal is lower than an absolute value of an impedance of the electronic component between the first electrode and the second electrode, at the at least one measuring frequency.

5. The electronic component inspection method according to claim 4,
wherein the at least one measuring frequency includes a frequency higher than or equal to 1 MHz.

6. The electronic component inspection method according to claim 4,
wherein the electronic component is partly made of a piezoelectric material.

7. The electronic component inspection method according to claim 6,
wherein the at least one measuring frequency includes an anti-resonance frequency corresponding to a maximum outside dimension of the electronic component.

8. The electronic component inspection method according to claim 7, further comprising
(c) evaluating mechanical defects of the electronic component, based on the impedance measured in the step (b-1) at the anti-resonance frequency.

9. The electronic component inspection method according to claim 4,
wherein the at least one measuring frequency includes at least one electrical resonance frequency of the electronic component.

10. The electronic component inspection method according to claim 1,
wherein the measuring of the electronic component is performed by using a measurement system for inspecting the electronic component in the step (b), and
wherein the conductive adhesive sheet forms a part of the measurement system and does not form a part of the electronic component.

11. The electronic component inspection method according to claim 8, further comprising
(d) separating the electronic component from the conductive adhesive sheet after the step (c).

* * * * *